United States Patent [19]

O'Young et al.

[11] Patent Number: 5,545,393
[45] Date of Patent: Aug. 13, 1996

[54] METHOD OF PREPARING MANGANESE OXIDE OCTAHEDRAL MOLECULAR SIEVE

[75] Inventors: Chi-Lin O'Young, Poughkeepsie; Robert A. Sawicki, Stormville, both of N.Y.

[73] Assignee: Texaco Inc., White Plains, N.Y.

[21] Appl. No.: 335,154

[22] Filed: Nov. 7, 1994

[51] Int. Cl.⁶ ............................................. C01G 45/02
[52] U.S. Cl. ............................................................ 423/605
[58] Field of Search ........................................ 423/605, 50

[56] References Cited

U.S. PATENT DOCUMENTS

| | | | |
|---|---|---|---|
| 1,078,788 | 11/1913 | Kaplan | 423/605 |
| 1,184,854 | 5/1916 | Holmes | 423/605 |
| 1,221,061 | 4/1917 | Kaplan | 423/605 |
| 3,214,236 | 10/1965 | Weisz | 423/213.2 |
| 5,061,675 | 10/1991 | Ebata et al. | 423/605 |
| 5,340,562 | 8/1994 | O'Young et al. | 423/599 |

FOREIGN PATENT DOCUMENTS

| | | | |
|---|---|---|---|
| 1157590 | 11/1963 | Germany | 423/605 |
| 273047 | 11/1989 | Germany | 423/605 |

OTHER PUBLICATIONS

Giovanoli et al., "A New Synthesis of Hollandite, A Possibility for Immobilization of Nuclear Waste", *Chimia*, 35, (1981) pp. 53–55, no month.
Chang et al., "Manganese Nodules as Demetalation Catalysts", no date, no publisher.
Shen et al., "Manganese Oxide Octahedral Molecular Sieves: Preparation, Characterization, and Applications", *Science*, Apr. 23, 1993, vol. 260, pp. 511–515.
Yin et al., "Temperature Program Desorption and Reduction Studies of Octahedral Molecular Sieves", J. Weitkamp et al. (Eds.) *Zeolites and Related Microporous Materials: State of the Art 1994* Studies in Surface Science and Catalysis, vol. 84, 1994 Elsevier Science B.V., no month.
Chi-Lin O'Young, "Hydrothermal Synthesis of Manganese Oxides with Tunnel Structures", *Synthesis of Microporous Materials*, vol. 11, pp. 333–340, M. L. Occelli, H. S. Robson Eds., Van Nostrand Reinhold, NY, 1992, no month.

De Guzman et al., "Role of Cyclic Voltammetry in Characterizing Solids: Natural and Synthetic Manganese Oxide Octahedral Molecular Sieves", *Chemistry of Materials, American Chemical Society*, 1993, vol. 5, pp. 1395–1400, no month.
Shen et al., "Octahedral Molecular Sieves: Preparation, Characterization and Applications", *J. Chem. Soc., Chem. Communications*, Issue 17, 1992, pp. 1213–1214, no month.
Shen et al., "Synthetic Todorokite: Preparation, Characterization and Application", *Ninth International Zeolite Conference, Extended Abstracts and Program*, Higgins et al. Eds., 1992, RP230, no month.
Shen et al., "Synthesis of Manganese Oxide Octahedral Molecular Sieves (OMS)", *Zeolites and Microporous Crystals*, 1994, pp. 19–24, no month.
Turner et al., "Todorokites: A New Family of Naturally Occurring Manganese Oxides", *Science*, vol. 212, pp. 1024–1027, 20 May 1981.
Daniels, et al. "Cationic Polymers . . . Crystallization," J. Am. Chem. Soc. 100, pp. 3097–3100, 1978, no month.

*Primary Examiner*—Steven Bos
*Attorney, Agent, or Firm*—Kenneth R. Priem; Dominick G. Vicari; Cynthia L. Hunter

[57] ABSTRACT

Manganese oxide octahedral molecular sieve (OMS) is produced by the method comprising:

a) forming an aqueous reaction medium containing manganese cation and permanganate anion, the reaction medium being maintained at a pH of not greater than about 4.5;

b) refluxing the aqueous reaction medium under conditions which are effective to produce solid crystalline manganese oxide octahedral molecular sieve product; and, c) recovering the solid crystalline product.

The method of this invention is carried out in an open system, i.e., a reflux condenser, and results in the formation of OMS which is thermally stable up to about 600° C.

17 Claims, 1 Drawing Sheet

METHOD OF PREPARING MANGANESE OXIDE OCTAHEDRAL MOLECULAR SIEVE

BACKGROUND OF THE INVENTION

This invention relates to a method for producing a manganese oxide octahedral molecular sieve (OMS). More particularly, this invention relates to a method for producing a manganese oxide octahedral molecular sieve which is carried out in an open system, e.g., under refluxing conditions.

Manganese oxide octahedral molecular sieves (OMS) possessing mono-directional tunnel structures constitute a family of molecular sieves wherein chains of $MnO_6$ octahedra share edges to form tunnel structures of varying sizes. Such materials have been detected in samples of terrestrial origin and are also found in manganese nodules recovered from the ocean floor. Manganese nodules have been described as useful catalysts in the oxidation of carbon monoxide, methane and butane (U.S. Pat. No. 3,214,236), the reduction of nitric oxide with ammonia (*Atmospheric Environment*, Vol. 6, p.309 (1972)) and the demetallation of topped crude in the presence of hydrogen (*Ind. Eng. Chem. Proc. Dev.*, Vol. 13, p.315 (1974)).

Pyrolusite, $\beta$-$MnO_2$, is a naturally occurring manganese oxide characterized by single chains of $MnO_6$ octahedra which share edges to form (1×1) tunnel structures which are about 2.3 Å square. Ramsdellite, $MnO_2$, is a naturally-occurring manganese oxide characterized by single and double chains of $MnO_6$ octahedra which share edges to form (2×1) tunnel structures which are about 4.6 Å by about 2.3 Å square. Nsutite, $\gamma$-$MnO_2$, is a naturally-occurring manganese oxide characterized by an intergrowth of pyrolusite-like and ramsdellite-like tunnel structures. Pyrolusite, ramsdellite and nsutite do not possess cations in their tunnel structures.

The hollandites are naturally occurring hydrous manganese oxides with tunnel structures (also described as "framework hydrates") in which Mn can be present as $Mn^{+4}$ and other oxidation states, the tunnels can vary in size and configuration and various mono- or divalent cations can be present in the tunnels. The hollandite structure consists of double chains of $MnO_6$ octahedra which share edges to form (2×2) tunnel structures. The average size of these tunnels is about 4.6 Å square. Ba, K, Na and Pb ions are present in the tunnels and coordinated to the oxygens of the double chains. The identity of the tunnel cations determines the mineral species. Specific hollandite species include hollandite ($BaMn_8O_{16}$), cryptomelane ($KMn_8O_{16}$), manjiroite ($NaMn_8O_{16}$) and coronadite ($PbMn_8O_{16}$).

The hydrothermal method of synthesizing a manganese oxide octahedral molecular sieve possessing (2×2) tunnel structures such as those possessed by the naturally-occurring hollandites is described in "Hydrothermal Synthesis of Manganese Oxides with Tunnel Structures," in *Synthesis of Microporous Materials*, Vol. II, 333, M. L. Occelli, H. E. Robson Eds. Van Nostrand Reinhold, N.Y., 1992 and R. Giovanili and B. Balmer, *Chimia*, 35 (1981) 53. Such synthetic octahedral molecular sieves having (2×2) tunnel structures are referred to in the art by the designation OMS-2. The (2×2) tunnel structure of OMS-2 is diagrammatically depicted in FIG. 1.

The hydrothermal method of synthesizing OMS-2 involves autoclaving an aqueous solution of manganese cation and permanganate anion under acidic conditions, i.e., pH<3, at temperatures ranging from about 80° to about 140° C. in the presence of counter cations having ionic diameters of between about 2.3 and about 4.6 Å. The counter cations can serve as templates for the formation of OMS-2 product and be retained in the tunnel structures thereof. Based on analytical tests, OMS-2 produced via this method is thermally stable up to about 600° C.

Alternatively, OMS-2 can be produced by the method disclosed in R. Giovanili and B. Balmer, *Chimia*, 35 (1981) 53. Thus, when manganese cation and permanganate anion are reacted under basic conditions, i.e., pH>12, a layered manganese oxide precursor is produced. This precursor is ion exchanged and then calcined at high temperatures, i.e., temperatures generally exceeding about 600° C., to form OMS-2 product. Analytical tests indicate that OMS-2 produced via this method is thermally stable up to about 800° C. and the average oxidation state of manganese ion is lower.

SUMMARY OF THE INVENTION

In accordance with the present invention a manganese oxide octahedral molecular sieve is produced by the method which comprising:

a) forming an aqueous reaction medium containing manganese cation and permanganate anion, the reaction medium being maintained at a pH of not greater than about 4.5;

b) refluxing the reaction medium under conditions effective to produce solid crystalline manganese oxide octahedral molecular sieve product; and, c) recovering the solid crystalline product.

Unlike the hydrothermal method of producing OMS-2 which involves the use of a closed-system reactor, i.e., an autoclave, and the application of autogenous pressure, the method of this invention is carried out in an open system, i.e., in a reflux condenser, which does not involve the application of pressure. OMS-2 produced by the refluxing method herein is thermally stable up to about 600° C.

DETAILED DESCRIPTION OF THE INVENTION

Figure 1:
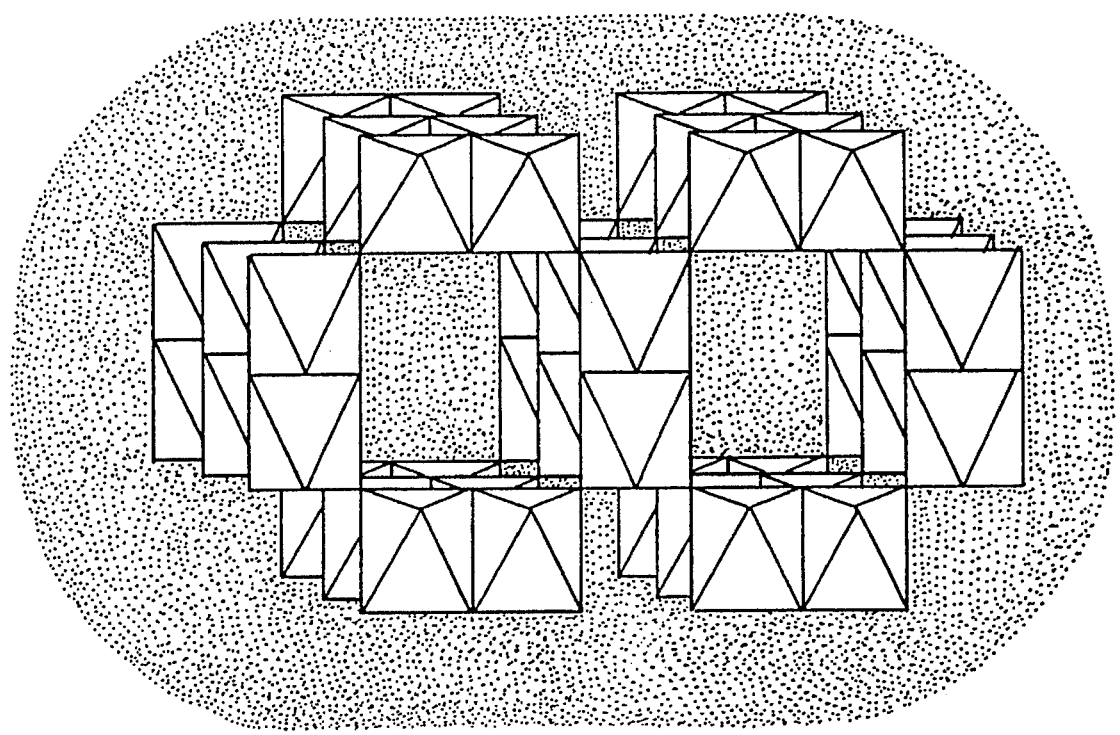
FIG. 1 is a diagrammatic representation of the three dimensional tunnel structure of OMS-2.

The aqueous reaction medium containing manganese cation and permanganate anion is preferably formed by first dissolving a manganese salt in aqueous medium, e.g., distilled deionized water, which is maintained at an initial pH of not greater than about 4.5 to provide a first solution. The concentration of manganese cation in the first solution is not narrowly critical and can range from about 0.5 to about 1M, preferably from about 0.1 to about 0.5M. Preferably, the pH of the first solution ranges from about 0 to about 4.0, and more preferably from about 1.0 to about 3.0. Suitable acids for adjusting the pH of the solution include the mineral acids, e.g., HCl, $H_2SO_4$, $HNO_3$, and strong organic acids such as toluene sulfonic acid and trifluoroacetic acid. A permanganate-salt is then dissolved in a separate aqueous medium, e.g., distilled deionized water, to provide a second solution. The concentration of permanganate anion in the second solution is likewise not narrowly critical and can range from about 0.05 to about 1M preferably, from about 0.1 to about 0.5M. Thereafter, the first solution and second solution are combined to form the aqueous reaction medium containing manganese cation and permangante anion. In another embodiment, the permanganate salt can be co-dissolved with the manganese salt in aqueous medium to provide the aqueous reaction medium containing manganese cation and permanganate anion. After formation of the reaction medium, the pH of the reaction medium can be adjusted to its initial level, if necessary, by the addition of an appropriate amount of a suitable acid such as one or more of the aforementioned pH-adjusting acids.

In general, any manganese salt, whether inorganic or organic, can be employed herein so long as it is soluble in aqueous medium. Suitable salts include, for example, the sulfate, nitrate and perchlorate salts and salts of organic acids such as acetates.

The permanganate salt is likewise not limited so long as it remains soluble in the aqueous reaction medium. In general, the permanganate salt can be an alkali or alkaline earth metal permanganate such as a permanganate of sodium, potassium, cesium, magnesium, calcium and barium. Ammonium or tetraalkylammonium permanganates can also be employed. The counter ions of the aforementioned permanganates, i.e., alkali metal cations, alkaline earth metal cations, ammonium cations and tetraalkylammonium cations, often enhance solubility of the permanganate anion in the aqueous reaction medium. In some cases, the counter ions, especially in the case of the larger counter ions such as potassium and barium, serve as templates for crystallization of OMS product and can remain in the tunnel structures of OMS as tunnel cations. Counter cations having ionic diameters of less than about 2.3 Å produce a nsutite structure, while those having ionic diameters ranging from about 2.3 to about 4.6 Å produce a (2×2) tunnel structure, i.e., OMS-2. Therefore, the particular permanganate salt employed in the practice of this invention can be selected for its ability to facilitate the formation and stabilization of the desired OMS product. Where a smaller counter ion, for example, sodium cation and/or magnesium cation, is utilized, the counter ion can have the desirable effect of allowing template materials other than the counter ion to affect the formation of OMS. The ionic diameters of some alkali and alkaline earth metal cations which can be employed are listed below:

| Cation | $Li^+$ | $Na^+$ | $K^+$ | $Cs^+$ | $Mg^{2+}$ | $Ca^{2+}$ | $Ba^{2+}$ |
|---|---|---|---|---|---|---|---|
| r(Å) | 1.36 | 1.96 | 2.66 | 3.78 | 1.30 | 1.98 | 2.70 |

Template materials which can be employed in producing OMS include tetraakylammonium salts in which the alkyl groups can contain from 1 to about 5 carbon atoms, can be the same or different and can be normal or branched in structure. Methyl, ethyl and propyl groups are representative of those alkyl groups which can advantageously be employed herein. The counter ion of the tetraalkylammonium salt can be any suitable inorganic or organic anion which will dissolve and remain in solution without interfering with the reaction or, optionally, form a precipitate with the counter ion of the permanganate salt employed in the method herein. Examples of such anions include the halides, hydroxides, bisulfates, sulfates, perchlorates, acetates and the like.

Also useful as organic templates are polymer chains containing synthetic polymers such as those described as cationic polymers, quaternary ammonium polymers and ionene polymers by Daniels et al. in "Cationic Polymers as Templates in Zeolite Crystallization," *J. Am. Chem. Soc.* 100, pp. 3097–3100 (1978) and Davis et al. in "Synthesis of Gmelinite and ASM-12 Zeolites with a Polymer Template," *J. Chem. Soc., Chem. Commun.* 1988, pp. 920–921.

The molar ratio of manganese cation to permanganate anion, $[Mn^{+2}]/[MnO_4^-]$, which can be expressed as $[Mn^{2+}]/[Mn^{7+}]$ for convenience, is one of the critical factors or parameters in determining the nature of the product obtained via the method of this invention. The $[Mn^{2+}]/[Mn^{7+}]$ ratio will generally be about 0.05 to about 3, preferably about 0.1 to about 2. When a ratio of about 0.1 to about 1.5 is employed, OMS-2 is formed. When a ratio of greater than about 2.5 is employed, OMS corresponding to the nsutites are formed.

The temperatures at which the reaction medium is refluxed can range broadly from about 40° C. to about 255° C. with the lower end of this temperature range tending to produce slower reactions. Temperatures in the range of from about 40° to about 70° C. will tend to produce the nsutite structures which have generally low crystallinities but contain structures characterized by tunnels of dimension l×n where the basic unit dimension is a manganese oxide octahedron and can be an integer of 1 or 2. Given an appropriate pH, the process of the invention can be carried out to produce materials of the OMS-2 structure at temperatures ranging from about 70° C. to about 155° C., preferably from about 80° to about 120° C. and more preferably from about 90° to about 110° C. For the production of pyrolusite (1×1) structures, the temperature preferably ranges from about 155° C. to about 255° C.

Generally, the reaction medium is refluxed in an open system, e.g., a condenser, for a period of time ranging from about 2 to about 48, preferably from about 12 to about 36, hours. The refluxing operation will result in the formation of a crystalline product characterized by three dimensional mono-directional tunnel structures formed by chains of edge-sharing $MnO_6$ octahedra. Following the refluxing step, the crystalline product can be recovered from the reaction medium by any suitable technique. In general, the product will be filtered, e.g., in a filter funnel under vacuum, washed with purified water and dried, preferably in an oven at about 120° C. for about 12 hours.

The octahedral molecular sieve produced by the method of this invention possesses acid sites, including Lewis and Bronsted sites. Applications include catalyzed reactions, e.g., isomerization and polymerization, and adsorption. Specific examples of catalysis and adsorption applications of OMS include the decomposition of alcohol, oxidation of CO, dehydrogenation of hydrocarbons, reduction of NO, hydrogenation of olefins, demetallation of petroleum residua, decomposition of organic sulfur compounds, decomposition of organic nitrogen compounds, decomposition of asphalt, adsorption of noxious gases and adsorption of heavy metal ions.

The following example is presented to illustrate specific embodiments of the practice of this invention and is not intended to be a limitation upon the scope of this invention.

EXAMPLE 1

Preparation of K-OMS-2 by Refluxing Method $MnSO_4 \cdot H_2O$ (8.8 g) was dissolved in 30 mL water containing 3 mL concentrated $HNO_3$ to provide an aqueous reaction medium having a pH of 1.0. A solution of $KMnO_4$ (5.89 g) in 100 mL water was added to the solution to provide an aqueous reaction medium containing manganese cation and permanganate anion. The reaction medium was refluxed at 100° C. for 24 hours to result in the formation of OMS-2 product containing potassium tunnel cations. The product was filtered, washed and dried at 120° C. The sample constituted 4.34% K and 56.4% Mn. X-ray powder diffraction data shows OMS-2 structure.

What is claimed is:

1. A method for producing a manganese oxide octahedral molecular sieve which comprises:
   a) forming an aqueous reaction medium containing manganese cation and permanganate anion and having a pH of not greater than about 4.5;
   b) refluxing the aqueous reaction medium to produce solid crystalline manganese oxide octahedral molecular sieve product; and,
   c) recovering the solid crystalline product.

2. The method of claim 1 wherein the solid crystalline product is a manganese oxide octahedral molecular sieve having a 2×2 tunnel structure.

3. The method of claim 2 wherein the tunnel structure of the solid crystalline product contains counter ions.

4. The method of claim 1 wherein the aqueous reaction medium is formed by:
   a) dissolving a manganese salt in aqueous medium to provide a first solution;
   b) dissolving a permanganate salt in aqueous medium to provide a second solution; and,
   c) combining the first solution and second solution to provide the aqueous reaction medium.

5. The method of claim 4 wherein the manganese salt is selected from the group consisting of $MnSO_4$, $MnNO_3$, $MnClO_4$ and $Mn(CH_3COO)_2$.

6. The method of claim 4 wherein the permanganate salt is an alkali metal permanganate, alkaline earth metal permanganate, ammonium permanganate or tetraalkylammonium permanganate.

7. The method of claim 6 wherein the permanganate salt is selected from the group consisting of $LiMnO_4$, $NaMnO_4$, $KMnO_4$, $CsMnO_4$, $Mg(MnO_4)_2$, $Ca(MnO_4)_2$ and $Ba(MnO_4)_2$.

8. The method of claim 1 wherein the pH of the reaction medium ranges from about 0 to about 4.

9. The method of claim 1 wherein the pH of the reaction medium ranges from about 1 to about 3.

10. The method of claim 1 wherein the aqueous reaction medium is refluxed in the presence of a template material.

11. The method of claim 1 wherein the molar ratio of manganese cation to permanganate anion is from about 0.05 to about 3.

12. The method of claim 1 wherein the molar ratio of manganese cation to permanganate anion is from about 0.1 to about 1.5.

13. The method of claim 1 wherein the temperature at which the reaction medium is refluxed ranges from about 40° to about 255° C.

14. The method of claim 1 wherein the temperature at which the reaction medium is refluxed ranges from about 70° to about 155° C.

15. The method of claim 1 wherein the reaction medium is refluxed for a period of time ranging from about 2 to about 48 hours.

16. The method of claim 1 wherein the reaction medium is refluxed for a period of time ranging from about 12 to about 36 hours.

17. The method of claim 1 wherein the product is recovered by the successive steps of filtering, washing and drying.

* * * * *